US012744728B2

(12) United States Patent
Mermoud et al.

(10) Patent No.: US 12,744,728 B2
(45) Date of Patent: Sep. 22, 2026

(54) PROACTIVE BYPASS SELECTION BASED ON ROOT CAUSE ANALYSIS OF TRACEROUTES

(71) Applicant: Cisco Technology, Inc., San Jose, CA (US)

(72) Inventors: Grégory Mermoud, Venthône (CH); Jean-Philippe Vasseur, Combloux (FR); Eduard Schornig, Haarlem (NL); Sambarta Dasgupta, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 18/204,124

(22) Filed: May 31, 2023

(65) Prior Publication Data

US 2024/0406095 A1 Dec. 5, 2024

(51) Int. Cl.

| | |
|---|---|
| ***H04L 45/302*** | (2022.01) |
| ***H04L 41/147*** | (2022.01) |
| ***H04L 43/10*** | (2022.01) |
| ***H04L 45/00*** | (2022.01) |

(52) U.S. Cl.

CPC .......... *H04L 45/302* (2013.01); *H04L 41/147* (2013.01); *H04L 43/10* (2013.01); *H04L 45/22* (2013.01)

(58) Field of Classification Search

CPC ....... H04L 45/302; H04L 45/30; H04L 45/22; H04L 45/70; H04L 41/147; H04L 41/16; H04L 45/24; H04L 43/10

USPC .......................................................... 370/252

See application file for complete search history.

(56) References Cited

U.S. PATENT DOCUMENTS

| | | | | |
|---|---|---|---|---|
| 10,027,530 | B2 | 7/2018 | Mahkonen et al. | |
| 10,079,749 | B2 * | 9/2018 | Kubik | H04L 45/24 |
| 10,862,771 | B2 | 12/2020 | Tomkins et al. | |
| 11,398,959 | B2 | 7/2022 | Yelahanka Raghuprasad et al. | |
| 11,424,977 | B2 | 8/2022 | Ravichandran et al. | |
| 11,456,926 | B1 * | 9/2022 | Mermoud | H04L 41/5067 |
| 12,047,425 | B1 * | 7/2024 | Schornig | H01L 41/147 |

(Continued)

OTHER PUBLICATIONS

Liu, et al., "Algorithms for the variable-sized bin packing problem with time windows", Computers and Industrial Engineering, vol. 155, May 2021, 107175, 8 pages, Science Direct, Elsevier.

(Continued)

*Primary Examiner* — Jungwon Chang
(74) *Attorney, Agent, or Firm* — Lee & Hayes, P.C.

(57) ABSTRACT

In one embodiment, a device identifies, based on traceroute information for a path in a network between an endpoint client and an online application, a particular segment of the path as most likely to cause degraded performance along the path. The device makes, using a prediction model, a prediction that routing traffic for the online application via the path will result in degraded quality of experience for the online application. The device obtains, based on the prediction, additional traceroute information in the network, to identify a bypass path in the network between the endpoint client and the online application that bypasses the particular segment. The device causes traffic for the online application to be routed along the bypass path.

20 Claims, 15 Drawing Sheets

(56) References Cited

U.S. PATENT DOCUMENTS

| | | | | |
|---|---|---|---|---|
| 2009/0122697 | A1* | 5/2009 | Madhyasha | H04L 43/50 370/229 |
| 2019/0182124 | A1* | 6/2019 | Jeuk | H04L 45/033 |
| 2021/0279632 | A1 | 9/2021 | Di Pietro et al. | |
| 2022/0052927 | A1* | 2/2022 | Yelahanka Raghuprasad | H04L 45/64 |
| 2022/0060393 | A1* | 2/2022 | Vasseur | H04L 45/30 |
| 2022/0095186 | A1* | 3/2022 | Zhang | H04W 36/14 |

OTHER PUBLICATIONS

Dhamdhere, et al., "NetDiagnoser: Troubleshooting network unreachabilities using end-to-end probes and routing data", CoNEXT' 07, Dec. 10-13, 2007, 12 pages, ACM, New York, NY, U.S.A.

Duffield, Nick, Network tomography of binary network performance characteristics. IEEE Transactions on Information Theory, vol. 52, No. 12, Dec. 2006, pp. 5373-5388, IEEE.

Boyd, et al., "Convex optimization", 2004, 730 pages, Cambridge University Press.

"Bin packing problem", online: https://en.wikipedia.org/wiki/Bin_packing_problem, accessed May 23, 2023, 16 pages, Wikimedia Foundation, Inc.

* cited by examiner

800

| Segment | e2e Loss(0,2) pScore | e2e Loss(2,5) pScore | e2e Loss(5,10) pScore | e2e Loss(....,...) pScore |
|---|---|---|---|---|
| host1 -> ip1 | 0.5 | 0 | 0.5 | 0 |
| ip1 -> ip2 | 0.5 | 0 | 0.5 | 0 |
| ip2 -> ip3 | 0 | 0 | 1 | 0 |
| ip3 -> ip4 | 1 | 0 | 0.5 | 0 |
| ip4 -> app2 | 0.5 | 0 | 0.5 | 0 |
| ip2 -> ip5 | 1 | 0 | 0 | 0 |
| ip5 -> ip6 | 1 | 0 | 0 | 0 |
| ip7 -> ip8 | 1 | 0 | 0 | 0 |

FIG. 8A

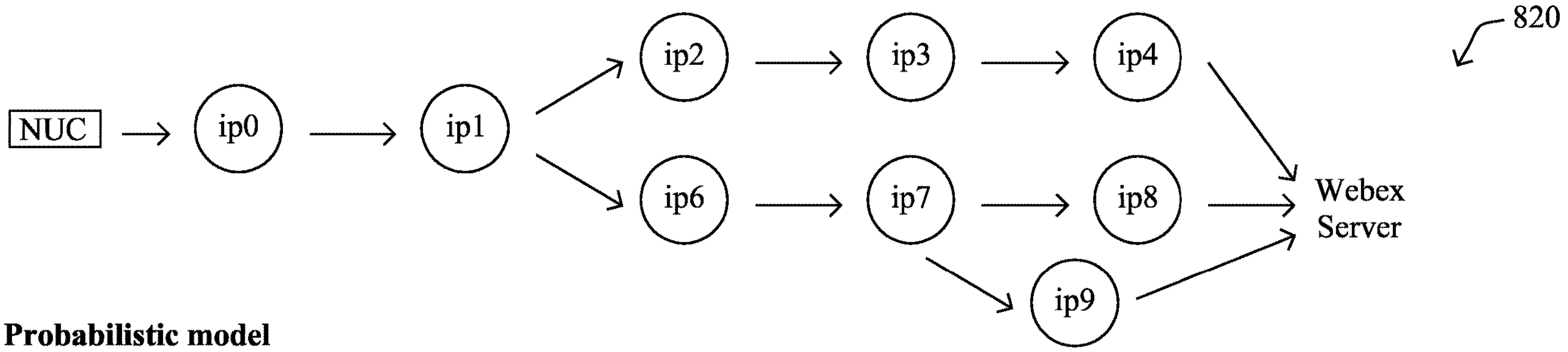

Probabilistic model
(3 known and 9 unknowns):
Under-determined system (more than one solution and will lead to an optimization problem $$\underline{\delta}_1 = 1 - (1 - \boldsymbol{p_{01}}) \cdot (1 - \boldsymbol{p_{12}}) \cdot (1 - \boldsymbol{p_{23}}) \cdot (1 - \boldsymbol{p_{34}})$$
$$\underline{\delta}_2 = 1 - (1 - \boldsymbol{p_{01}}) \cdot (1 - \boldsymbol{p_{16}}) \cdot (1 - \boldsymbol{p_{67}}) \cdot (1 - \boldsymbol{p_{78}})$$
$$\underline{\delta}_3 = 1 - (1 - \boldsymbol{p_{01}}) \cdot (1 - \boldsymbol{p_{16}}) \cdot (1 - \boldsymbol{p_{67}}) \cdot (1 - \boldsymbol{p_{79}})$$

Multiplicative to Addictive by Log Transformation

$$\log(1 - \underline{\delta}_1) = \log(1 - \boldsymbol{p_{01}}) + \log(1 - \boldsymbol{p_{12}}) + \log(1 - \boldsymbol{p_{23}}) + \log(1 - \boldsymbol{p_{34}})$$
$$\log(1 - \underline{\delta}_2) = \log(1 - \boldsymbol{p_{01}}) + \log(1 - \boldsymbol{p_{16}}) + \log(1 - \boldsymbol{p_{67}}) + \log(1 - \boldsymbol{p_{78}})$$
$$\log(1 - \underline{\delta}_3) = \log(1 - \boldsymbol{p_{01}}) + \log(1 - \boldsymbol{p_{16}}) + \log(1 - \boldsymbol{p_{67}}) + \log(1 - \boldsymbol{p_{79}})$$

Variable Transformation

$$\boldsymbol{\theta_{01}} = \log(1 - \boldsymbol{p_{01}}),\ \boldsymbol{\theta_{12}} = \log(1 - \boldsymbol{p_{12}}),\ \boldsymbol{\theta_{23}} = \log(1 - \boldsymbol{p_{23}})$$
$$\boldsymbol{\theta_{34}} = \log(1 - \boldsymbol{p_{34}}),\ \boldsymbol{\theta_{16}} = \log(1 - \boldsymbol{p_{16}}),\ \boldsymbol{\theta_{67}} = \log(1 - \boldsymbol{p_{67}})$$
$$\boldsymbol{\theta_{78}} = \log(1 - \boldsymbol{p_{78}}),\ \boldsymbol{\theta_{16}} = \log(1 - \boldsymbol{p_{16}}),\ \boldsymbol{\theta_{79}} = \log(1 - \boldsymbol{p_{79}})$$

Estimation (Optimization Problem)

$$\log(1 - \underline{\delta}_1) \approx \boldsymbol{\theta_{01}} + \boldsymbol{\theta_{12}} + \boldsymbol{\theta_{23}} + \boldsymbol{\theta_{34}}$$
$$\log(1 - \underline{\delta}_2) \approx \boldsymbol{\theta_{01}} + \boldsymbol{\theta_{16}} + \boldsymbol{\theta_{67}} + \boldsymbol{\theta_{78}}$$
$$\log(1 - \underline{\delta}_3) \approx \boldsymbol{\theta_{01}} + \boldsymbol{\theta_{16}} + \boldsymbol{\theta_{67}} + \boldsymbol{\theta_{79}}$$

Subject to Constraints

$$\boldsymbol{\theta_{01}} \leqq 0,\ \boldsymbol{\theta_{12}} \leqq 0,\ \boldsymbol{\theta_{23}} \leqq 0,\ \boldsymbol{\theta_{34}} \leqq 0,$$
$$\boldsymbol{\theta_{16}} \leqq 0,\ \boldsymbol{\theta_{67}} \leqq 0,\ \boldsymbol{\theta_{78}} \leqq 0,\ \boldsymbol{\theta_{79}} \leqq 0.$$

FIG. 8C

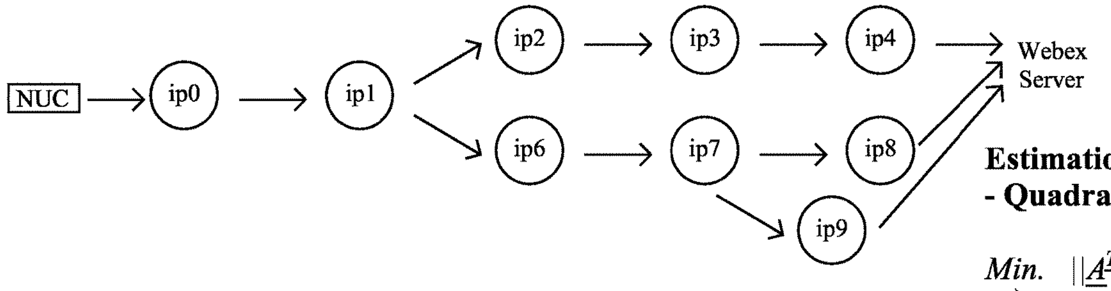

830

Estimation Problem (Convex Optimization - Quadratic Programming)

$$\underset{\vec{\theta}}{Min.} \; \| \underline{A}^T \vec{\boldsymbol{\theta}} - \log(1 - \vec{\underline{\delta_1}}) \|^2 + \lambda \, \|\vec{\boldsymbol{\theta}}\|_{L_1}$$

Regularization Term

Subject to

$\vec{\theta} \prec 0$

Variable Transform

$\vec{\boldsymbol{P}} = 1 - e^{\vec{\theta}}$

Topology Matrix of Test Paths (Known)

$\underline{A}$ =

| | **Path1** | **Path1** | **Path1** |
|---|---|---|---|
| ip0 -> ip1 | 1 | 1 | 1 |
| ip1 -> ip2 | 1 | 0 | 0 |
| ip2 -> ip3 | 1 | 0 | 0 |
| ip3 -> ip4 | 1 | 0 | 0 |
| ip1 -> ip6 | 0 | 1 | 1 |
| ip6 -> ip7 | 0 | 1 | 1 |
| ip7 -> ip8 | 0 | 1 | 0 |
| ip7 -> ip9 | 0 | 0 | 1 |

E2E Loss Per Path (Known)

$\vec{\underline{\delta_1}}$ =

| | **E2E Loss Prob** |
|---|---|
| Path1 | $\underline{\delta_1}$ |
| Path2 | $\underline{\delta_2}$ |
| Path3 | $\underline{\delta_3}$ |

Known quantities are marked by underlined text and unknowns by bold text

HBH Loss Per Segment (Unknown)

$\vec{\boldsymbol{P}}$ =

| | **E2E Loss Prob** |
|---|---|
| ip0 -> ip1 | $\hat{p}_{01}$ |
| ip1 -> ip2 | $\hat{p}_{12}$ |
| ip2 -> ip3 | $\hat{p}_{23}$ |
| ip3 -> ip4 | $\hat{p}_{34}$ |
| ip1 -> ip6 | $\hat{p}_{16}$ |
| ip6 -> ip7 | $\hat{p}_{67}$ |
| ip7 -> ip8 | $\hat{p}_{78}$ |
| ip7 -> ip9 | $\hat{p}_{79}$ |

Transformed HBH Loss Per Segment (Unknown)

$\vec{\boldsymbol{\theta}}$ =

| | **E2E Loss Prob** |
|---|---|
| ip0 -> ip1 | $\hat{\theta}_{01}$ |
| ip1 -> ip2 | $\hat{\theta}_{12}$ |
| ip2 -> ip3 | $\hat{\theta}_{23}$ |
| ip3 -> ip4 | $\hat{\theta}_{34}$ |
| ip1 -> ip6 | $\hat{\theta}_{16}$ |
| ip6 -> ip7 | $\hat{\theta}_{67}$ |
| ip7 -> ip8 | $\hat{\theta}_{78}$ |
| ip7 -> ip9 | $\hat{\theta}_{79}$ |

FIG. 8D

PROACTIVE BYPASS SELECTION BASED ON ROOT CAUSE ANALYSIS OF TRACEROUTES

TECHNICAL FIELD

The present disclosure relates generally to computer networks, and, more particularly, to proactive bypass selection based on root cause analysis of traceroutes.

BACKGROUND

With the recent advancements in artificial intelligence/machine learning, it now becomes possible to predict when a given network path will afford poor user experience within a given online application. For instance, there may be sufficient path telemetry available to train a prediction model to predict when a given path will violate a service level agreement (SLA) associated with the application (e.g., the loss, jitter, or delay of the path will exceed a defined SLA threshold). However, testing has also revealed that SLAs are often a poor proxy for the true user experience. For instance, the codec of the application may be resilient to packet loss much higher than that of the SLA threshold, meaning that users of the application would not have noticed the predicted SLA violation, anyways.

Moreover, even with the ability to accurately predict degraded user experiences by predicting SLA violations as a proxy, the questions still remain: where is the actual root cause of the problem in the network and how can it be avoided? Indeed, even if a model were to predict that a given path is likely to lead to degraded application experience, such a prediction offers no insights as to why that may be.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8D illustrate examples of identify a path segment as a root cause of degraded path performance.

DESCRIPTION OF EXAMPLE EMBODIMENTS

Overview

Figure 1A:
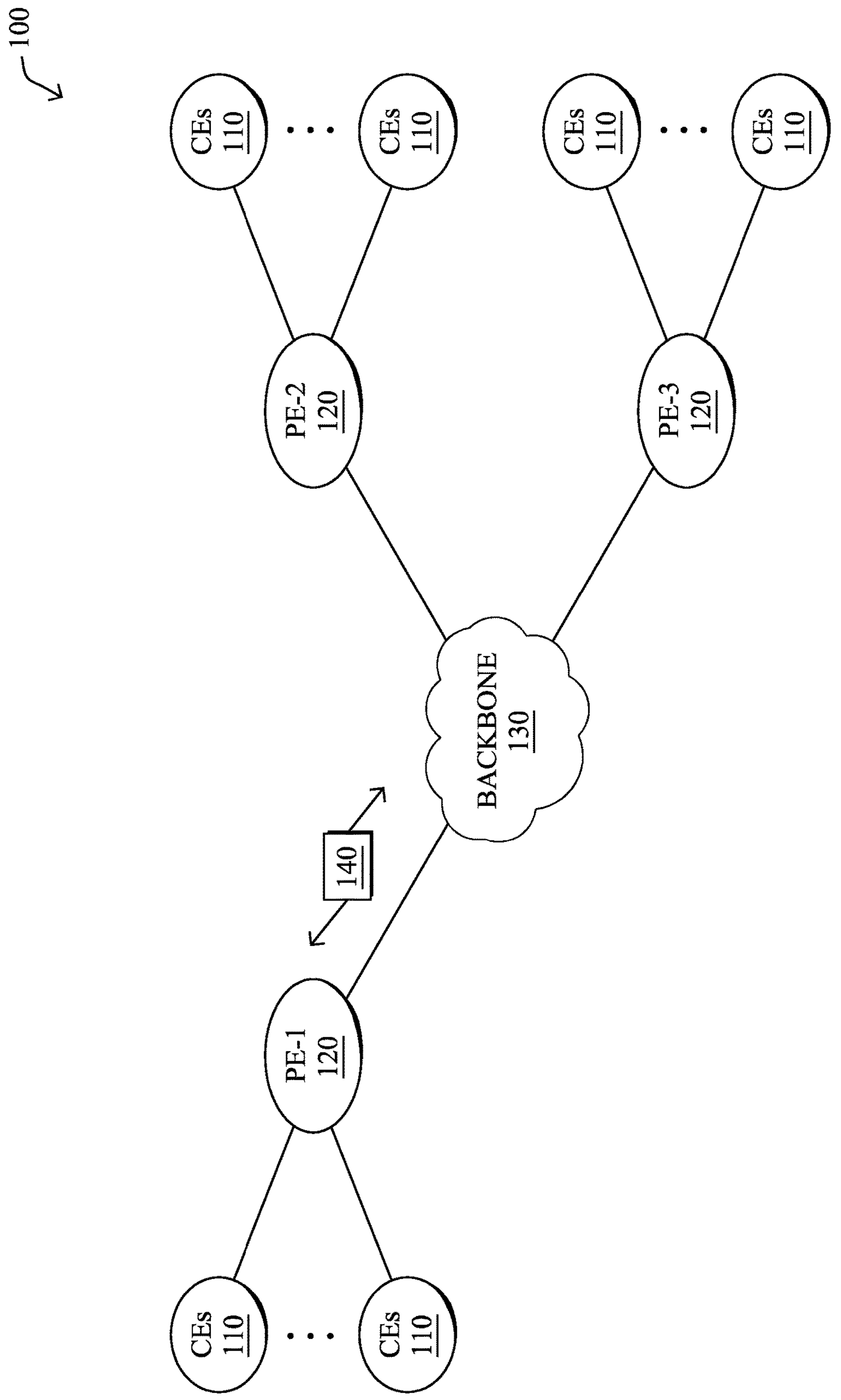
FIGS. 1A-1B illustrate an example communication network.

According to one or more embodiments of the disclosure, a device identifies, based on traceroute information for a path in a network between an endpoint client and an online application, a particular segment of the path as most likely to cause degraded performance along the path. The device makes, using a prediction model, a prediction that routing traffic for the online application via the path will result in degraded quality of experience for the online application. The device obtains, based on the prediction, additional traceroute information in the network, to identify a bypass path in the network between the endpoint client and the online application that bypasses the particular segment. The device causes traffic for the online application to be routed along the bypass path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
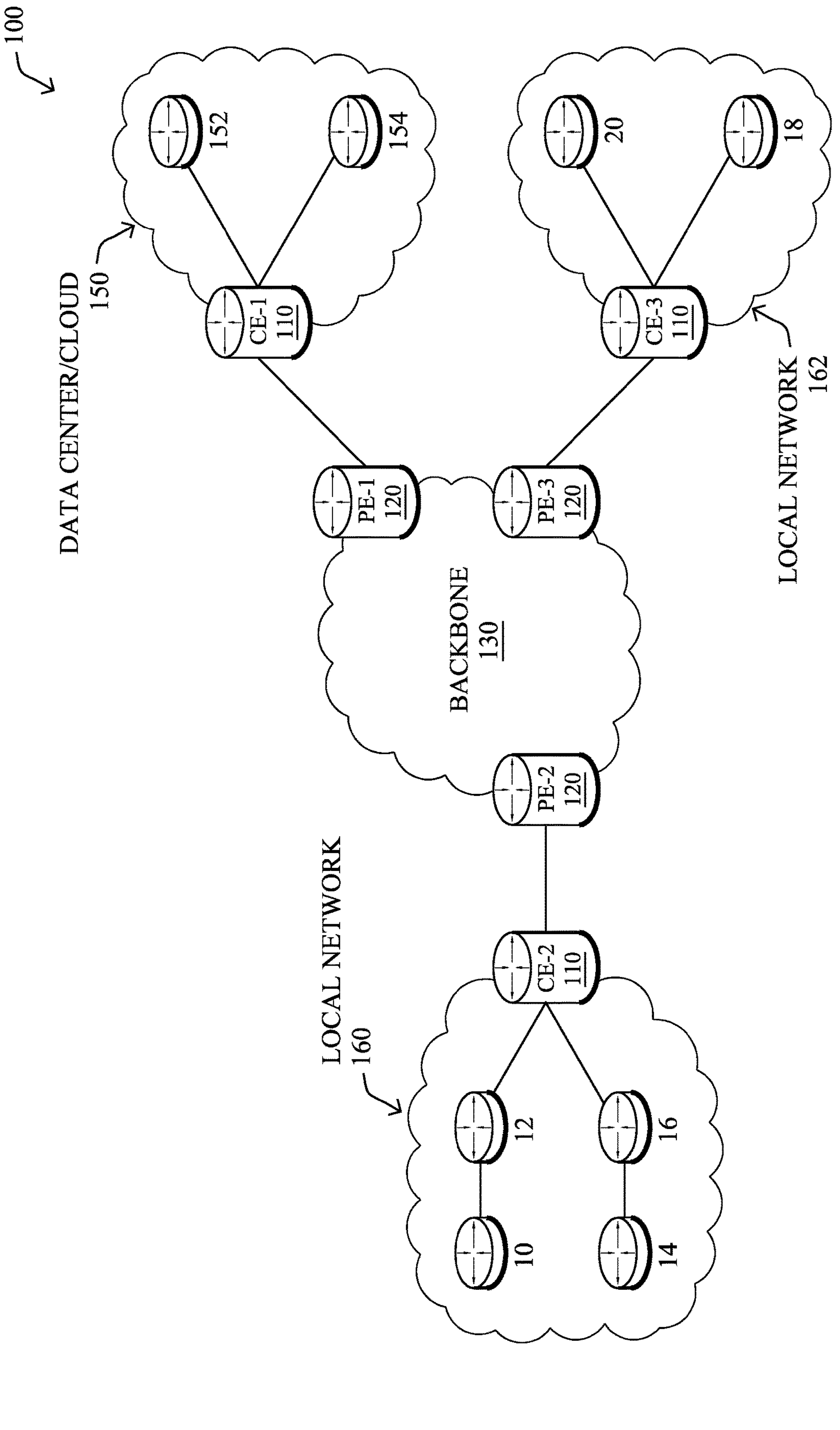

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
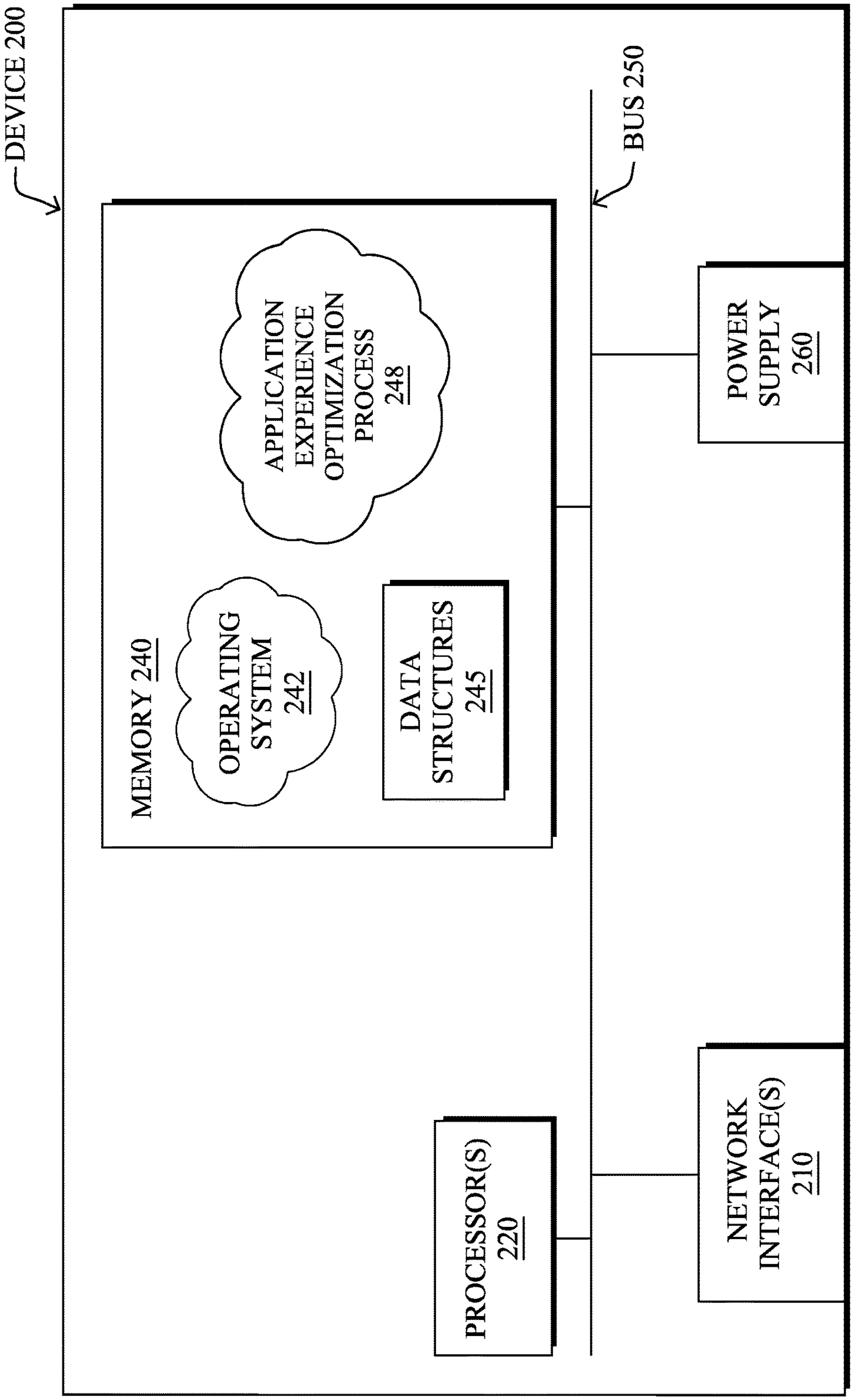
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
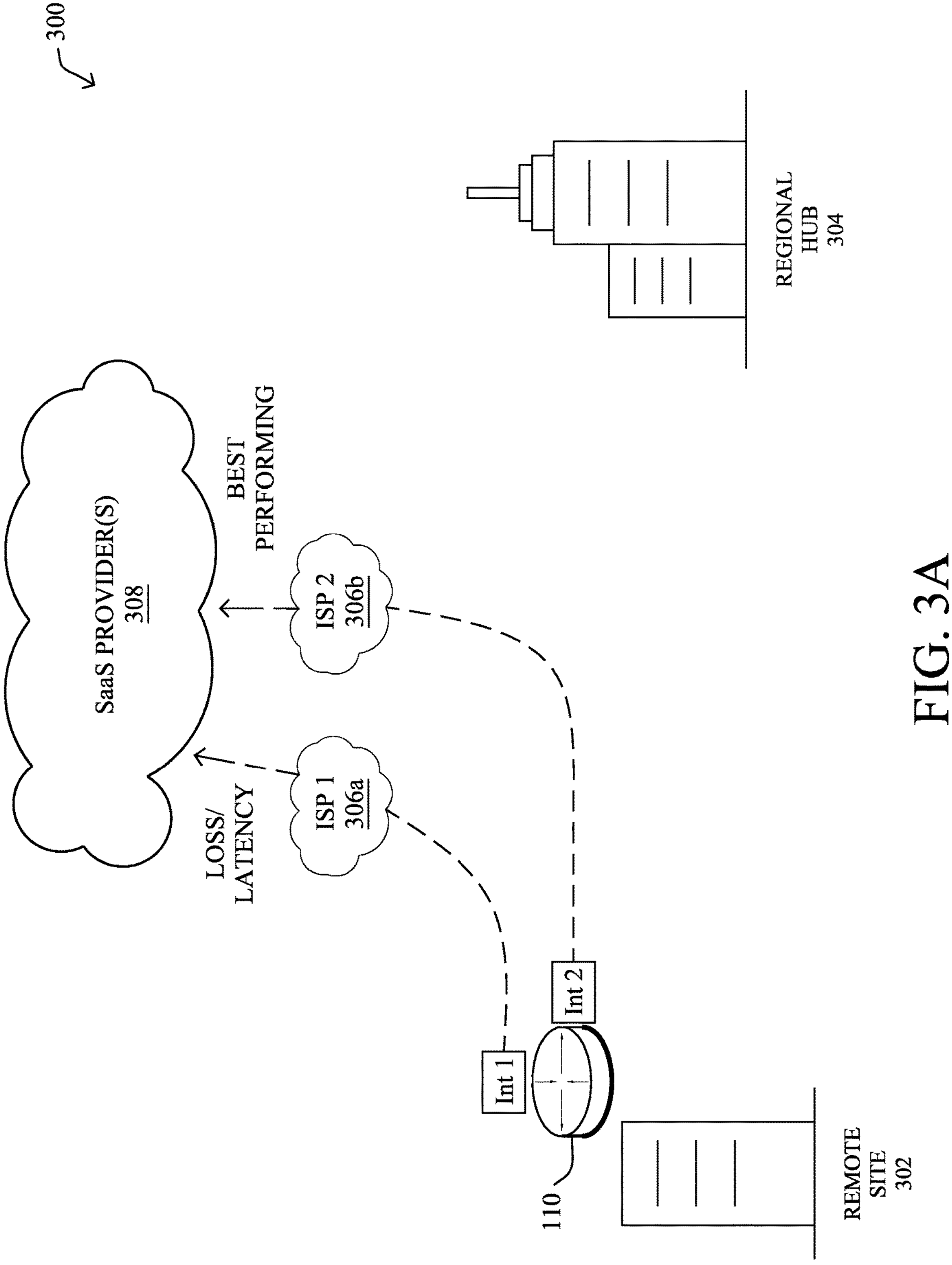
FIGS. 3A-3B illustrate example network deployments.
Figure 3B:
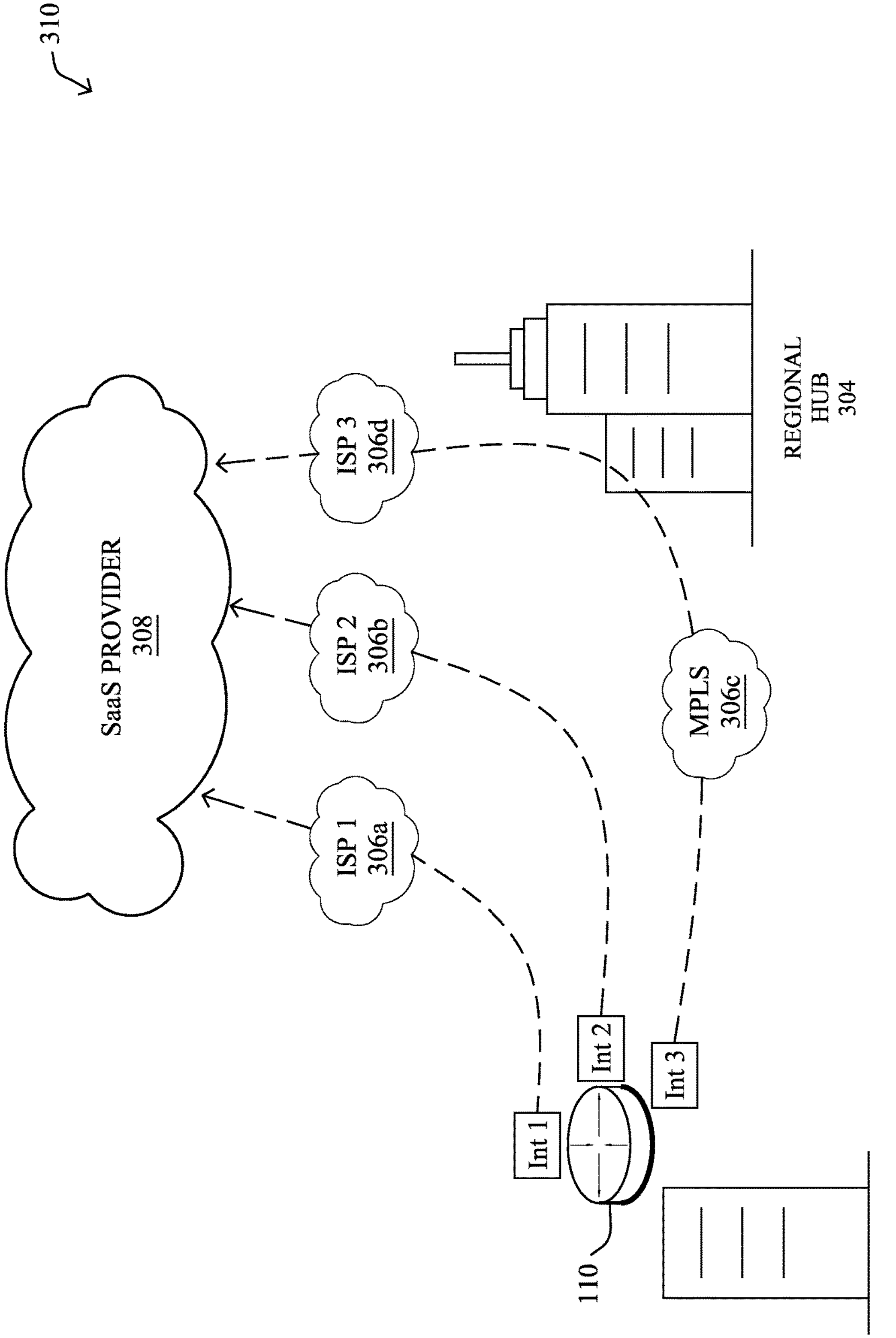

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
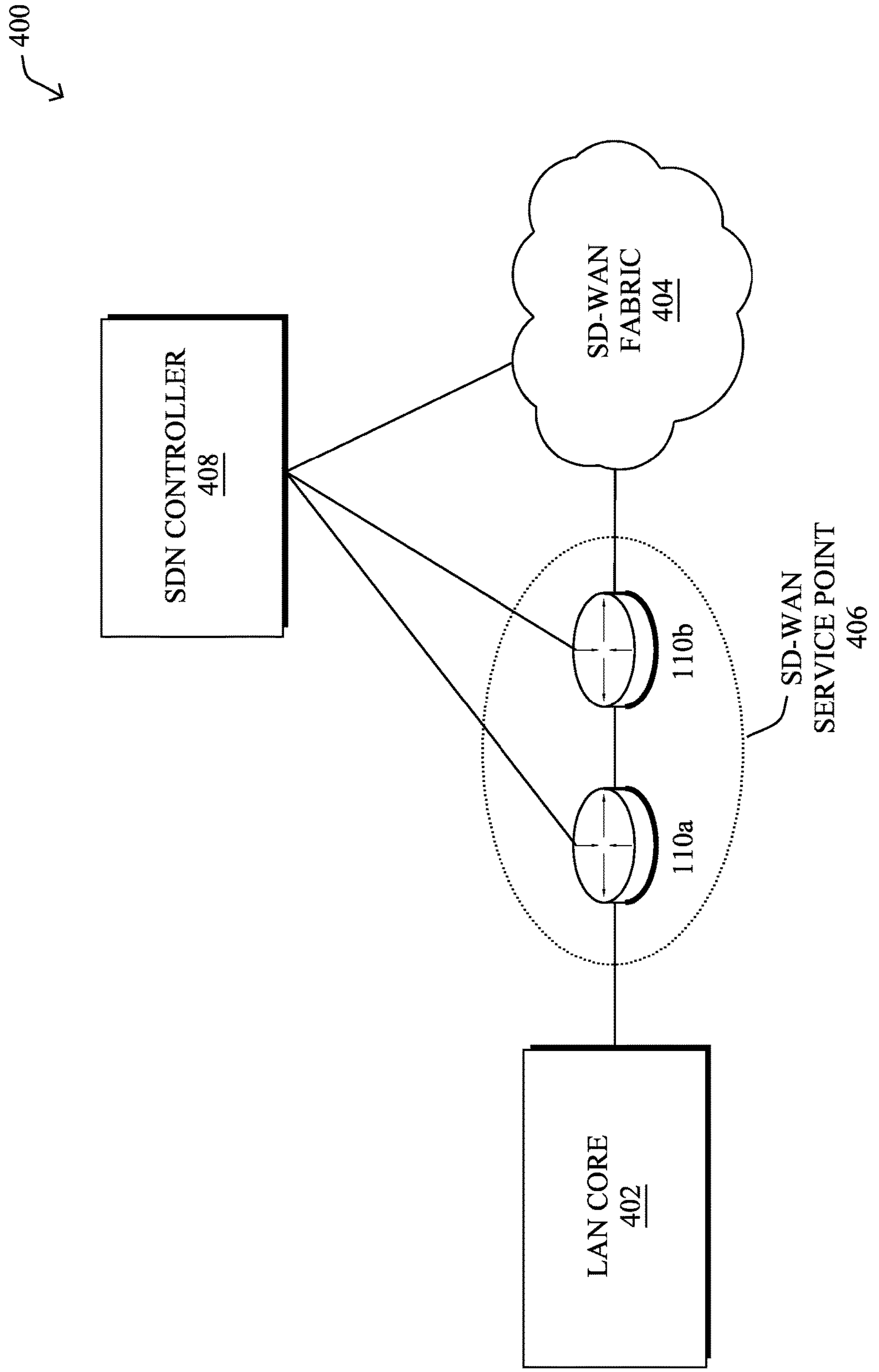
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
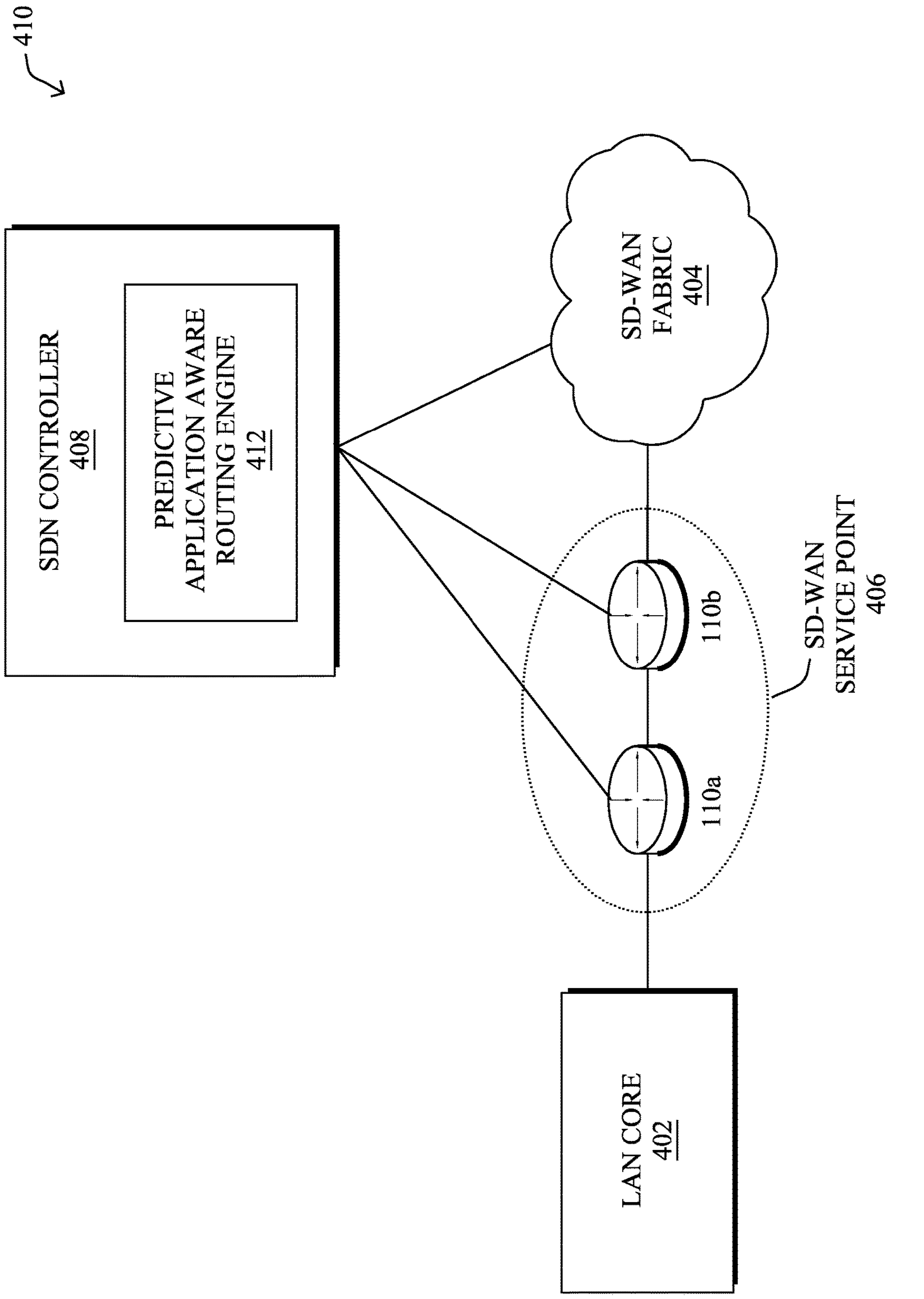

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, cognitive networking represents an evolution over predictive networking approaches that seek to rely on path metrics solely as a proxy for the application experience for a given online application, by taking into account cross-layer telemetry. Using such an approach, the network may be able to reconfigure itself to optimize the true subjective application user experience (cognition), such as by leveraging Software Defined Cloud Interconnect (SDCI) and Middle Mile Optimization (MMO)) techniques, to provision new nodes in the network (e.g., a router or web proxy) to act as a bypass, i.e., divert traffic away from a segment causing poor application QoE. However, this is not a simple task and requires first identifying the path segment that is the potential root cause of the degradation.

Proactive Bypass Selection Based on Root Cause Analysis of Traceroutes

The techniques introduced herein expand the cognitive networking approach above to allow for the selection of a network action that will proactively increase the QoE metric for an online application. In some aspects, the techniques herein leverage traceroute data to perform root cause analysis (RCA) of QoE degradations. The outcome of this is a time-wise attribution of responsibility to a set of one or more network segments, which can be used as input to a predictive (e.g., forecasting) engine, to forecast degradation and pre-provision or pre-select bypass path(s) to avoid specific, recurring issues of a segment.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device identifies, based on traceroute information for a path in a network between an endpoint client and an online application, a particular segment of the path as most likely to cause degraded performance along the path. The device makes, using a prediction model, a prediction that routing traffic for the online application via the path will result in degraded quality of experience for the online application. The device obtains, based on the prediction, additional traceroute information in the network, to identify a bypass path in the network between the endpoint client and the online application that bypasses the particular segment. The device causes traffic for the online application to be routed along the bypass path.

Figure 5:
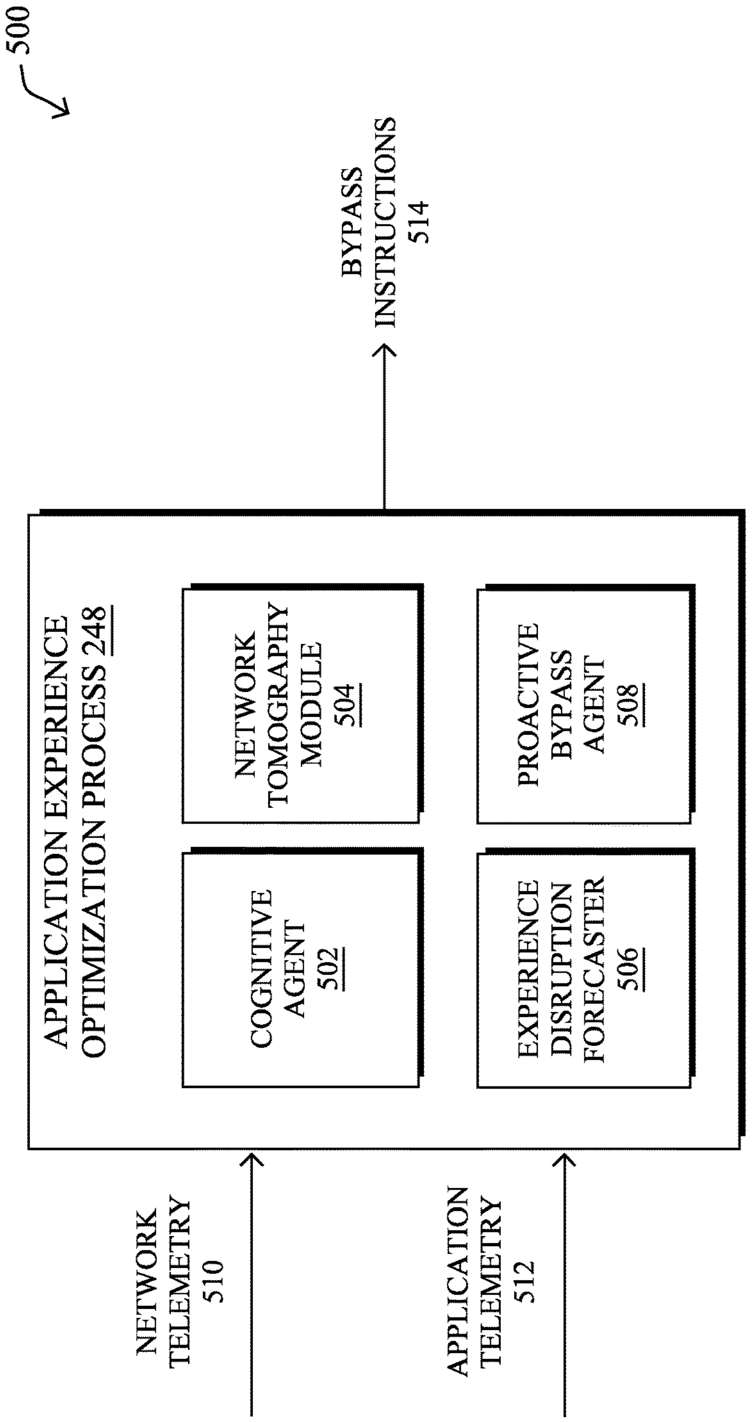
FIG. 5 illustrates an example architecture for proactive bypass selection based on root cause analysis of traceroutes.

Operationally, FIG. 5 illustrates an example architecture for proactive bypass selection based on root cause analysis of traceroutes, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network. In further embodiments, application experience optimization process 248 may be used to provide recommendations to a user interface, such as that of a network administrator (e.g., to indicate a root cause of an issue, to recommend a configuration change, etc.).

As shown, application experience optimization process 248 may include any or all of the following components: a cognitive agent 502, a network tomography module 504, an experience disruption forecaster 506, and/or a proactive bypass agent 508. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

In various embodiments, cognitive agent 502 may be responsible for obtaining the following telemetry, either on a pull or push basis:

Network telemetry 510—such telemetry may be generated by one or more routers or other networking devices in the network (e.g., the CE router associated with a given endpoint client, etc.), an agent on the endpoint itself, or any other device in the network, and indicate performance metrics such as path loss, latency, jitter, etc. In various embodiments, network telemetry 510 may also include traceroute information captured by agents (e.g., ThousandEyes agents, etc.) executed by these devices performing path tracing/probing.

Application telemetry 512—In addition to obtaining network telemetry 510, cognitive agent 502 may also obtain telemetry data generated by the online application of interest, itself. For instance, such telemetry may indicate the application experiences of its users, such as user satisfaction ratings, application-level metrics that could indicate the true QoE of the application (e.g., concealment rate, etc.).

Figure 6:
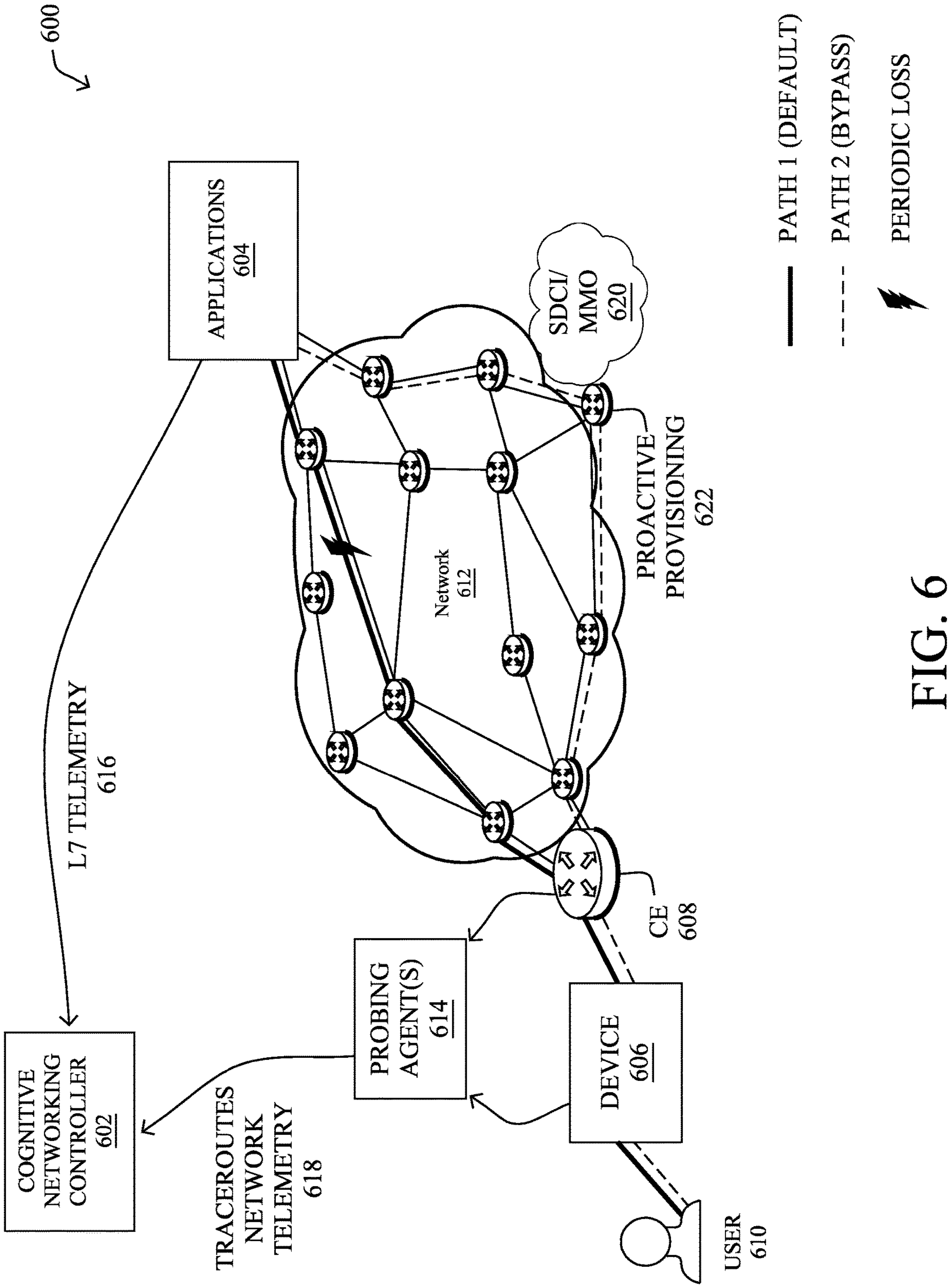
FIG. 6 illustrates an example of provisioning a bypass path in a network.

By way of example, FIG. 6 illustrates an example cognitive network 600, according to various embodiments. More specifically, as shown, assume that there are any number of online applications 604 accessible to a client endpoint 606 (e.g., an endpoint device) operated by an end user 610 via a network 612, such as the Internet or other such network. In addition, a CE router 608 may provide connectivity to client endpoint 606.

According to various embodiments, cognitive network 600 may include a cognitive networking controller 602, which may be implemented through execution of a specialized form of application experience optimization process 248 adapted to perform the functions described herein. At a high level, cognitive networking controller 602 may be responsible for generating QoE optimizations actions in cognitive network 600. To do so, cognitive networking controller 602 may obtain network telemetry 618 from any number of nodes in cognitive network 600, which may also include traceroute information. For instance, assume that any number of probing agents 614 are executed by devices such as client endpoint 606, CE router 608, etc., and report network telemetry 618 to cognitive networking controller 602 either directly or indirectly. In addition, cognitive networking controller 602 may also obtain Layer 7/application telemetry 616 from online applications 604, such as via an application programming interface (API).

Referring again to FIG. 5, with respect to network telemetry 510, traceroute information is commonly used for discovering intermediate Layer 3 hops (e.g., routers) between two network endpoints. It utilizes increments of the Time to Live (TTL) IP header to get a response from each intermediate hop along a given path. Such information may appear similar to the following:

traceroute to 8.8.8.8 (8.8.8.8), 64 hops max, 52 byte packets 1 192.168.86.1 (192.168.86.1) 11.043 ms 8.867 ms 9.508 ms 2 dhcp-077-250-175-001.chello.n1 (77.250.175.1) 16.094 ms 16.345 ms 231.974 ms 3 212.142.51.25 (212.142.51.25) 18.446 ms 52.754 ms 19.471 ms 4 asd-tr0021-cr101-be112-2.core.as33915.net (213.51.7.92) 17.161 ms 15.595 ms 30.156 ms 5 nl-ams14a-ri1-ae51-0.core.as9143.net (213.51.64.186) 14.264 ms 17.861 ms 13.964 ms 6 10ge-1-4.cr1.ams2.baseip.com (213.46.182.22) 17.394 ms 74.125.146.228 (74.125.146.228) 14.559 ms 10ge-1-4.cr1.ams2.baseip.com (213.46.182.22) 19.270 ms

7 * * *

8 dns.google (8.8.8.8) 23.459 ms 13.974 ms 34.945 ms

Most current traceroute implementations send three packets for each TTL value and record the round-trip delay for each. For some hops, the packets might be load-balanced across multiple devices or interfaces of the same device, such that there may be distinct IP addresses for the same position (e.g., hop 6 in the above example). Some routers might also be configured to ignore Internet Control Message Protocol (ICMP) requests, in which case no data is collected (e.g., hop 7 in the above example).

Multiple limitations make traceroute limited as a troubleshooting tool. First, many network operators limit the number of probes that their devices respond to as a mechanism to preserve resources and/or preserve against distributed denial of service (DDoS) attacks. This makes traceroute a poor indicator of packet loss. Second, even when a device responds to a traceroute, it does so in a best-effort fashion, that is, most other tasks running on the system (e.g., routing protocols, convergence, monitoring, etc.) may preempt the process responsible for responding to such probes. As a result, latencies reported by traceroute may not necessarily be a reliable indicator of real traffic latency.

Now, although the loss and latency values reported by the traceroute tool are not quite as reliable as one might expect, the techniques herein combine end-to-end probing (possibly using real application packets) and underlay discovery based on traceroute to obtain accurate root causing of path segments that are at fault.

In various embodiments, network tomography module 504 may be responsible for inferring from the traceroute telemetry, which network segment (defined as an oriented pair of hops) is most likely to be responsible for an issue. To do so, network tomography module 504 may correlate data from traceroute records belonging to multiple (source, destination) pairs collected at the same point in time to identify problematic nodes/segments. Thus, network tomography module 504 may ingest end-to-end traceroute telemetry (e.g., from network telemetry 510 collected by cognitive agent 502) from a large cohort of agents located on devices such as CE routers or endpoint clients and produces a regular time-series for each segment (e.g., 10.137.201.97→10.255.191.213 in FIG. 7) of the underlay topology.

Figure 7:
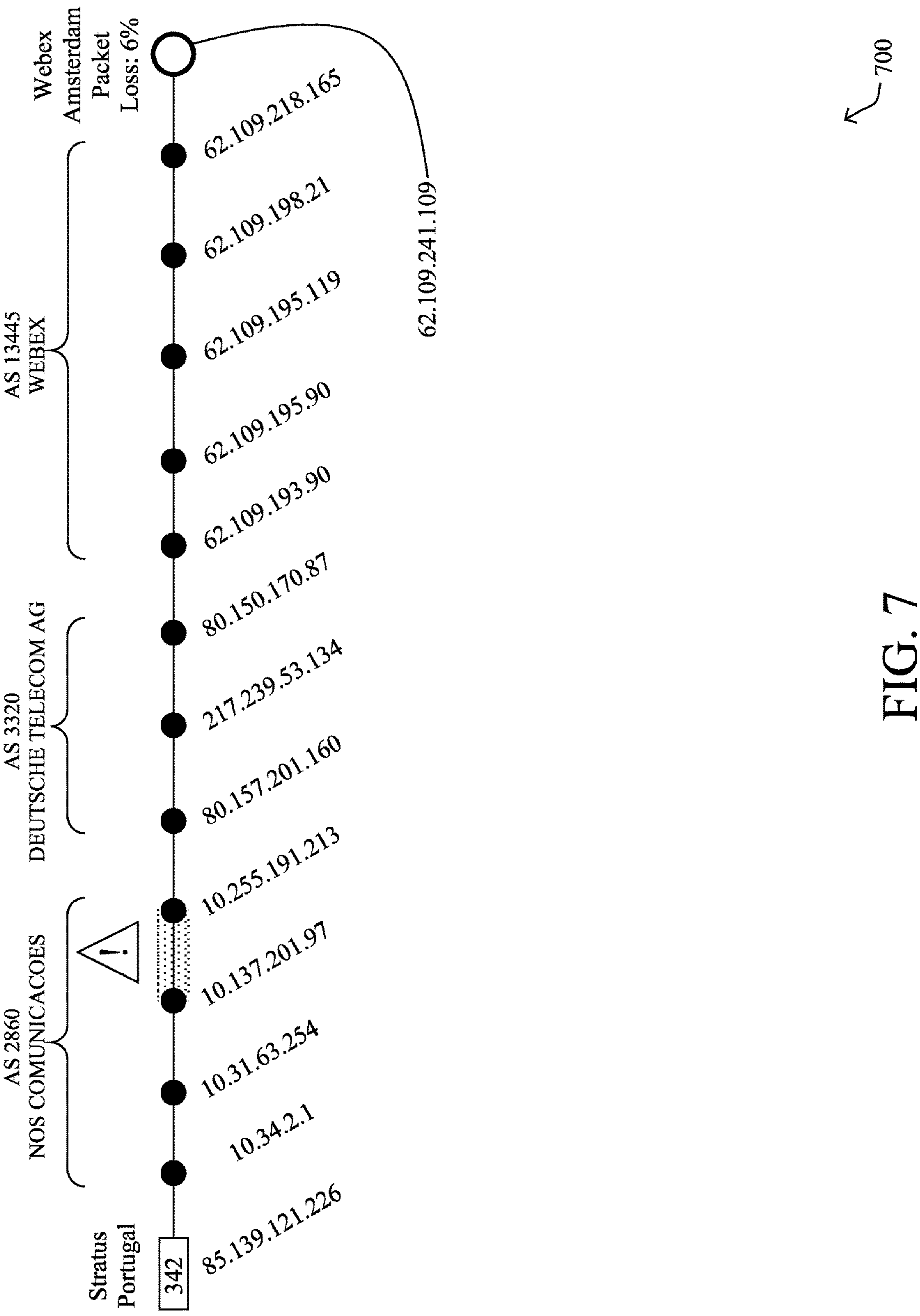
FIG. 7 illustrates an example diagram of a network path.

FIG. 7 illustrates an example diagram 700 of a network path based on the output of network tomography module 504. More specifically, 700 show an end-to-end traceroute between a site in Portugal and the Webex datacenter in Amsterdam. An end-to-end loss of 6% was measured along this path, and the algorithm used by network tomography module 504 was able to pinpoint a single segment (10.137.201.97→10.255.191.213) as being the root cause of this problem. As a result, the segment may be assigned a loss of 6% for this specific time step while all other segments are assigned a loss of 0%. As would be appreciated, such root cause is unknown when using traditional path traceroute, which only provide end-to-end measurements of loss and latency.

Referring again to FIG. 5, network tomography module 504 may perform its root cause analysis in a number of ways. In one embodiment, network tomography module 504 may do so using a statistical heuristic approach. In such an approach, network tomography module 504 may approximate a probability score for each segment available in known topology against multiple packet loss bins (intervals) using the formula below:

$$pScore = \frac{binCount}{totalCount}$$

where:

binCount: total number of times the segment appears in a traceroute with e2e loss within the bin bounds at t0.

totalCount: total number of times the segment appears across any traceroute at t0.

pScore: probability score that the IP segment is responsible for packet loss that falls within the bin ranges at time t0.

Multiple packet loss intervals (bins) at various levels of granularity can be defined based on networking domain expert knowledge. In turn, network tomography module 504 may associate the individual IP segments and scores with each packet loss bin and populate this information into a matrix, such as matrix 800 shown in FIG. 8A.

As shown in FIG. 8A, given a traceroute record with an associated e2e packet loss value at time t0, network tomography module 504 may use the score matrix to identify the segment(s) with the highest pScore for the e2e Packet Loss Bin matching the original traceroute.

This statistical approach provides a very simple and computationally inexpensive mechanism for identifying the most likely segments responsible for packet loss and has shown promising results when tested on real network topologies. However, it does suffer from several caveats, such as relying on the definition of packet loss bins that use heuristic thresholds (e.g. [0-2], [2-5], [5-10] and so on). Thus, the definition of critical link is inherently dependent on these heuristic thresholds. Secondly, the statistical approach ignores the topology of the traceroutes, e.g., interaction between segments and ignores the sequence of segments along a path. In certain scenarios, this can lead to false positives, as the high score will be assigned to all segments along a path.

In an alternate embodiment, network tomography module 504 may instead use a Graphical Convex Optimization (CGO) approach, which is a principled approach that estimates the loss probability for each IP segment (sometimes referred to as hop-by-hop loss), as opposed to the binary assignment of the criticality. Furthermore, the GCO approach optimizes a global convex function to solve the loss estimation problem for test paths, spanning across all source and destinations. The loss for each link (IP segment) will be an unknown variable (to be estimated) and the end-to-end (E2E) Loss represented for each test path in terms of the link losses (to be estimated). The E2E losses (are known) and the topology (connectivity) information will serve as ground truth for the estimation problem. This way, network tomography module 504 will have more unknowns and few known quantities.

Figure 8B:
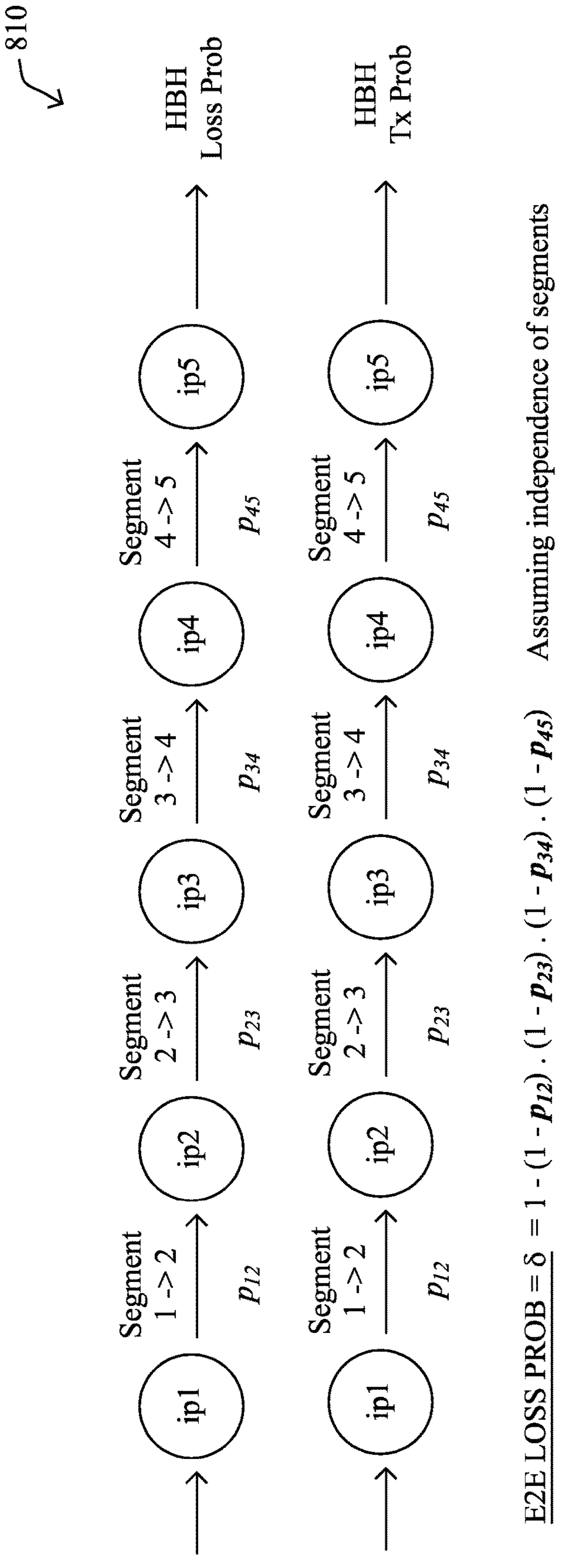

For sake of simplicity, the GCO algorithm is described in the time-invariant case. In practice, the algorithm is to be run independently for each time window or the temporal dependency of the loss probabilities for the links can be modeled as a Markov chain. For instance, FIG. 8B illustrates an example 810 for a test path (one time snapshot). In example 810, the E2E Loss (known) is expressed in terms of the loss probabilities (unknowns). Thus, there are four unknown variables for one known variable. Similarly, the E2E Loss can be defined for all test paths. There will be repeating links across paths that will reduce the number of unknows (segment loss prob) with respect to the number of known quantities (end-to-end loss probabilities). Still, the number of unknowns will be more than number of known values, leading to an estimation/optimization problem.

FIG. 8C illustrates an example 820 with three paths in a particular time instance. The probabilistic models for the three paths in terms of the end-to-end loss (known) and hop-by-hop loss for segments (unknown) are presented to the top left of FIG. 8C. performing some transformation, the estimation problem can be posed as an estimation problem, as shown in the right of FIG. 8C.

Furthermore, the problem can be expressed as a convex optimization problem, as shown in example 830 in FIG. 8D, in some embodiments. As shown, the optimization to the top right is called a convex optimization (with convex cost function and convex hull constraints) and can be solved effectively by using Interior Point algorithms in polynomial time. This is another advantage of using GCO as it does not require solving combinatorial problems. The cost function of the optimization is regularized with an L1 term to ensure there are fewer critical segments; sparse solution for the $\theta^{\rightarrow}$ will lead to sparse solution for $P^{\rightarrow\rightarrow}$, i.e. fewer critical links will be selected. The cost function combines the topology in terms of the topology (A matrix) and the delta (E2E loss) vector.

Thus, in some embodiments, the output of network tomography module 504 is, therefore, a time-series of loss (and, optionally, latency) for each segment. For instance, such a timeseries may look similar to the following:

TABLE 1

| Timestamp | Source IP | Destination IP | Loss | Latency |
|---|---|---|---|---|
| 2023-02-01T12:00:00Z | 10.137.201.97 | 10.255.191.213 | 0.00 | 15 |
| 2023-02-01T12:01:00Z | 10.137.201.97 | 10.255.191.213 | 0.06 | 16 |
| 2023-02-01T12:02:00Z | 10.137.201.97 | 10.255.191.213 | 0.04 | 13 |
| 2023-02-01T12:03:00Z | 10.137.201.97 | 10.255.191.213 | 0.00 | 15 |

In various embodiments, experience disruption forecaster 506 is responsible for proactively identifying QoE-impacting disruptions. To this end, experience disruption forecaster 506 may take as input the timeseries produced by network tomography module 504 and QoE predictions produced by a constituent QoE prediction model that has access to end-to-end Layer 7 metrics using either or both of the following:

1. Using a forecasting algorithm responsible for predicting the loss or latency of each segment for a given horizon. For instance, experience disruption forecaster 506 may apply a broad variety of suitable algorithms such as ARIMA, seasonal-trend decompositions such as Prophet or LOESS, or full-blown machine learning models such as LSTM or Transformers.

2. Correlation analysis (i.e. regression) between loss and latency values for each segment and the QoE of traffic routed along it. Generally, this analysis answers the question" "is a given loss/latency value susceptible to impact the QoE of an application A?" This correlation analysis may take very basic form (i.e., looking at historical correlation between the metric values and the QoE scores) or full-fledged regression analysis (e.g., using a Gradient Boosting or a Deep Neural Network model).

The combination of these two capabilities allows experience disruption forecaster 506 to assign a risk score to each segment at future time points within a given horizon (e.g., 1 hour). This risk score S_{a→b}^t denotes the probability that the segment a→b causes a significant drop in QoE at time t. As a result, the output of experience disruption forecaster 506 may look as follows:

TABLE 2

| Timestamp | Source IP | Destination IP | Risk |
|---|---|---|---|
| 2023-02-01T12:10:00Z | 10.137.201.97 | 10.255.191.213 | 0.01 |
| 2023-02-01T12:11:00Z | 10.137.201.97 | 10.255.191.213 | 0.00 |
| **2023-02-01T12:12:00Z** | **10.137.201.97** | **10.255.191.213** | **0.43** |
| **2023-02-01T12:13:00Z** | **10.137.201.97** | **10.255.191.213** | **0.32** |
| 2023-02-01T12:14:00Z | 10.137.201.97 | 10.255.191.213 | 0.01 |

Highlighted in bold are times at which the segment 10.137.201.97→10.255.191.213 has a high probability of impacting negatively the QoE (for a given application). Recall that this is the result of a combination of forecasting individual loss/latency values from historical data for this segment and the determination that such values are often associated with a significant QoE impact at the Layer 7 level.

In various embodiments, proactive bypass agent 508 may be responsible for setting up and testing bypass tunnels ahead of experience disruptions, via bypass instructions 514. To this end, it consumes the risk scores produced by experience disruption forecaster 506 and maintain a database risk scores across all the network segments identified by cognitive agent 502 using traceroute or network telemetry.

Upon detecting a high risk of QoE disruption for a given segment a→b at time t, proactive bypass agent 508 may perform the following actions:

1. Identify existing bypass paths that could be suitable for avoiding the segment a→b. To achieve this, it needs the routing at time t, which is not known. A heuristic solution consists in triggering a traceroute from the end device or CE router to the application via candidate bypasses and use those that do not include the segment a→b (or any other "risky" segments in the database of proactive bypass agent 508). Since routing tables may change at any point in time, proactive bypass agent 508 may regularly check the candidate bypasses until the action is enforced and the traffic routed along the bypass route.
2. If no suitable bypass exists, proactive bypass agent 508 may provision one or more new ones in locations or regions that are likely to bypass the segment. To do so, proactive bypass agent 508 may use the following 2-step heuristic strategy, in some embodiments:
   a. Perform traceroute from the client to the candidate bypass locations and obtain a shortlist of low-risk paths.
   b. Provision bypasses in the shortlist, and then run end-to-end traceroutes via those. Keep the lowest risk bypass and shutdown others.

Then, proactive bypass agent 508 may repeat 1.) above for the newly provisioned bypasses.

3. When a candidate bypass is selected, proactive bypass agent 508 may continuously check that the segment a→b or any other "risky" segment is part of the path using traceroute.
4. At time t, the traffic is re-routed to the bypass path using a lightweight tunnel or proxy configuration of the endpoint.

By way of example, consider again cognitive network 600 in FIG. 6. As shown, assume that a particular segment along the default path (path 1) between client endpoint 606 and number of online applications 604 exhibits periodic loss. In such a case, cognitive networking controller 602 may predict that this segment and, consequently, the entire path, is likely to again exhibit loss, resulting in degraded application QoE. In turn, cognitive networking controller 602 may evaluate whether a suitable bypass exists and, if not, may proactively provision a new bypass node 622 (e.g., using SDCI/MMO 620 or another similar network function). Consequently, there will now be a new bypass path (path 2) provisioned in advance of when the default path is expected to again exhibit loss and degrade the application experience. In turn, cognitive networking controller 602 may cause the application traffic to be rerouted along this bypass path, such as by sending an instruction to CE router 608 or even to client endpoint 606, itself.

Referring again to FIG. 5, as bypass routers and proxies are expensive, proactive bypass agent 508 may also be configured to decommission them as default routes become risk-free again. To this end, proactive bypass agent 508 may attempt to allocate as many paths as possible to as few bypasses as possible. This is a combinatorial optimization problem analogous to the (variable-sized) Bin packing problem wherein items of different sizes (i.e., paths carrying up to X Mbps application traffic, with X being the size of the item) must be packed into a finite number of bins, of variable capacity (i.e., bypasses with a given bandwidth), in a way that minimizes the number of bins. This is a NP-hard problem, but there exist approximations that can run in pseudo-polynomial time.

Figure 9:
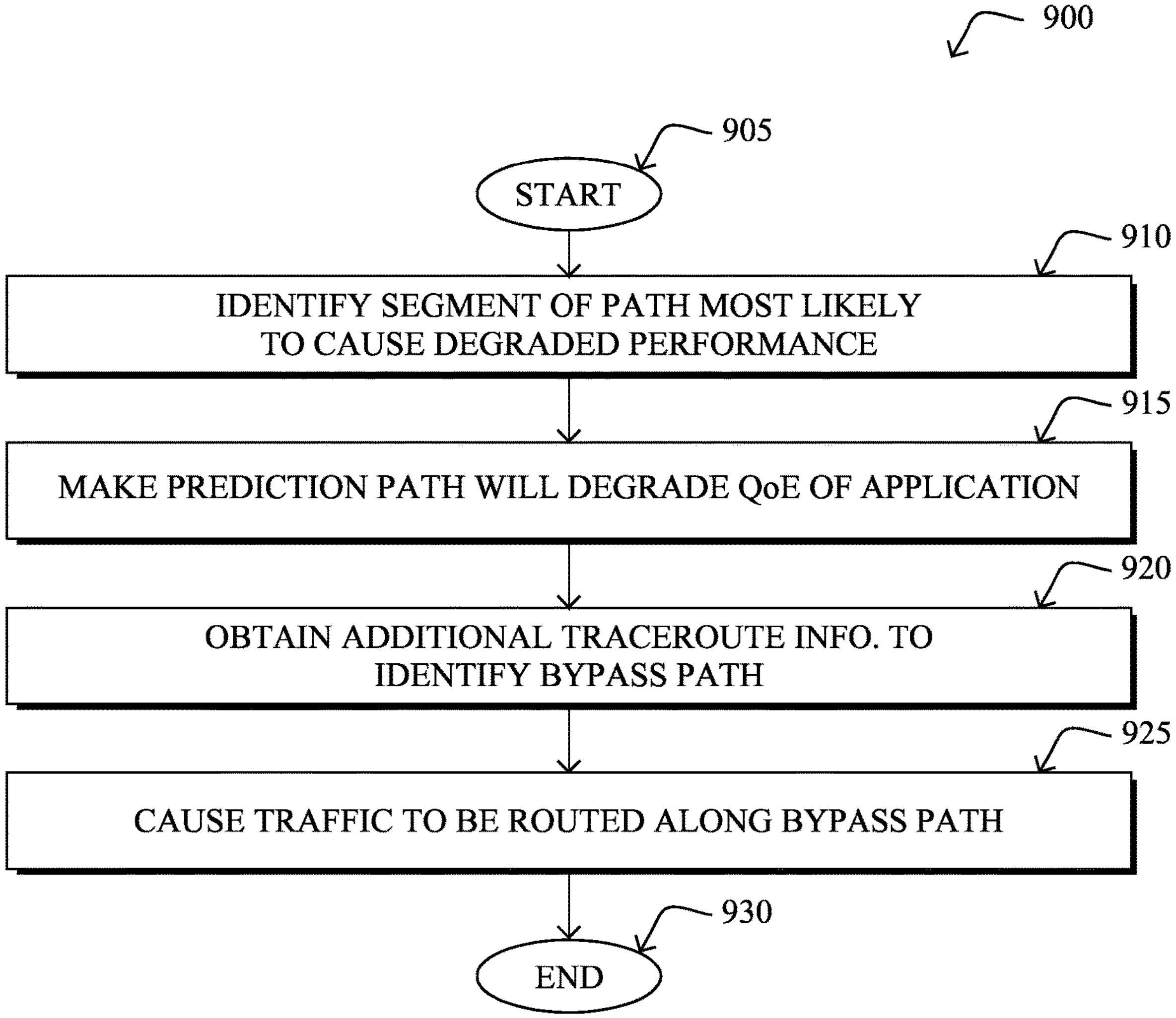
FIG. 9 illustrates an example simplified procedure for proactive bypass selection based on root cause analysis of traceroutes.

FIG. 9 illustrates an example simplified procedure (e.g., a method) for proactive bypass selection based on root cause analysis of traceroutes, in accordance with one or more embodiments described herein. For example, a non-generic, specifically configured controller for a network (e.g., device 200) may perform procedure 900 by executing stored instructions (e.g., application experience optimization process 248). The procedure 900 may start at step 905, and continues to step 910, where, as described in greater detail above, the device may identify, based on traceroute information for a path in a network between an endpoint client and an online application, a particular segment of the path as most likely to cause degraded performance along the path. In some embodiments, the traceroute information for the path is captured by a probing agent executed by the endpoint client or an edge router associated with the endpoint client.

In various embodiments, the network comprises a software-defined networking (SDN) overlay, such as an SD-WAN.

At step 915, as detailed above, the device may make, using a prediction model, a prediction that routing traffic for the online application via the path will result in degraded quality of experience for the online application. In some embodiments, the prediction model is trained using quality of experience metrics captured by the online application.

At step 920, the device may obtain, based on the prediction, additional traceroute information in the network, to identify a bypass path in the network between the endpoint client and the online application that bypasses the particular segment, as described in greater detail above. In some embodiments, the device may do so by requesting that one or more probing agents in the network perform probing tests of additional paths in the network to the online application. In one embodiment, the device identifies the bypass path as an existing bypass path based on the additional traceroute information.

At step 925, as detailed above, the device may cause traffic for the online application to be routed along the bypass path. In one embodiment, the traffic for the online application is routed along the bypass path via a tunnel. In another embodiment, the device may do so by setting a proxy configuration of the endpoint client. In some embodiments, the device may also identify a new bypass point in the network, based on the additional traceroute information, when the additional traceroute information indicates that no bypass path exists. In turn, the device may provision the new bypass point to form the bypass path in the network. In some embodiments, the device may also deprovision the new bypass point, based on a prediction by the prediction model that routing traffic for the online application via the path will no longer degrade quality of experience for the online application.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for proactive bypass selection based on root cause analysis of traceroutes, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

identifying, by a device and based on traceroute information for a path in a network between an endpoint client and an online application, a particular segment of the path as most likely to cause degraded performance along the path, the particular segment being an oriented hop pair of the path inferred from the traceroute information;

making, by the device and using a prediction model, a prediction that routing traffic for the online application via the path will result in degraded quality of experience for the online application;

obtaining, by the device and based on the prediction, and prior to causing traffic for the online application to be routed along a bypass path, additional traceroute information for one or more candidate paths in the network, to identify, from among the one or more candidate paths, the bypass path between the endpoint client and the online application whose traceroute information does not include the particular segment; and causing, by the device, traffic for the online application to be routed along the bypass path.

2. The method as in claim 1, wherein the prediction model is trained using quality of experience metrics captured by the online application.

3. The method as in claim 1, wherein the traffic for the online application is routed along the bypass path via a tunnel.

4. The method as in claim 1, wherein causing the traffic for the online application to be routed along the bypass path comprises:

setting a proxy configuration of the endpoint client.

5. The method as in claim 1, further comprising:

identifying a new bypass point in the network, based on the additional traceroute information, when the additional traceroute information indicates that no bypass path exists; and provisioning the new bypass point to form the bypass path in the network.

6. The method as in claim 5, further comprising:

deprovisioning the new bypass point, based on a prediction by the prediction model that routing traffic for the online application via the path will no longer degrade quality of experience for the online application.

7. The method as in claim 1, wherein the traceroute information for the path is captured by a probing agent executed by the endpoint client or an edge router associated with the endpoint client.

8. The method as in claim 1, wherein obtaining the additional traceroute information in the network comprises:

requesting that one or more probing agents in the network perform probing tests of additional paths in the network to the online application.

9. The method as in claim 1, wherein the device identifies the bypass path as an existing bypass path based on the additional traceroute information.

10. The method as in claim 1, wherein the network comprises a software-defined networking (SDN) overlay.

11. An apparatus, comprising:
one or more network interfaces;
a processor coupled to the one or more network interfaces and configured to execute one or more processes; and
a memory configured to store a process that is executable by the processor, the process when executed configured to:
identify, based on traceroute information for a path in a network between an endpoint client and an online application, a particular segment of the path as most likely to cause degraded performance along the path, the particular segment being an oriented hop pair of the path inferred from the traceroute information;
make, using a prediction model, a prediction that routing traffic for the online application via the path will result in degraded quality of experience for the online application;
obtain, based on the prediction and prior to causing traffic for the online application to be routed along a bypass path, additional traceroute information for one or more candidate paths in the network, to identify, from among the one or more candidate paths, the bypass path between the endpoint client and the online application whose traceroute information does not include the particular segment; and
cause traffic for the online application to be routed along the bypass path.

12. The apparatus as in claim 11, wherein the prediction model is trained using quality of experience metrics captured by the online application.

13. The apparatus as in claim 11, wherein the traffic for the online application is routed along the bypass path via a tunnel.

14. The apparatus as in claim 11, wherein the apparatus causes the traffic for the online application to be routed along the bypass path by:
setting a proxy configuration of the endpoint client.

15. The apparatus as in claim 11, wherein the process when executed is further configured to:
identify a new bypass point in the network, based on the additional traceroute information, when the additional traceroute information indicates that no bypass path exists; and provision the new bypass point to form the bypass path in the network.

16. The apparatus as in claim 15, wherein the process when executed is further configured to:
deprovision the new bypass point, based on a prediction by the prediction model that routing traffic for the online application via the path will no longer degrade quality of experience for the online application.

17. The apparatus as in claim 11, wherein the traceroute information for the path is captured by a probing agent executed by the endpoint client or an edge router associated with the endpoint client.

18. The apparatus as in claim 11, wherein the apparatus obtains the additional traceroute information in the network by:
requesting that one or more probing agents in the network perform probing tests of additional paths in the network to the online application.

19. The apparatus as in claim 11, wherein the process when executed is configured to identify the particular segment by correlating data from traceroute records belonging to multiple source-destination pairs collected at the same point in time to identify the particular segment as most likely responsible for the degraded performance.

20. A tangible, non-transitory, computer-readable medium storing program instructions that cause a device to execute a process comprising:
identifying, by a device and based on traceroute information for a path in a network between an endpoint client and an online application, a particular segment of the path as most likely to cause degraded performance along the path, the particular segment being an oriented hop pair of the path inferred from the traceroute information;
making, by the device and using a prediction model, a prediction that routing traffic for the online application via the path will result in degraded quality of experience for the online application;
obtaining, by the device and based on the prediction, and prior to causing traffic for the online application to be routed along a bypass path, additional traceroute information for one or more candidate paths in the network, to identify, from among the one or more candidate paths, the bypass path between the endpoint client and the online application whose traceroute information does not include the particular segment; and
causing, by the device, traffic for the online application to be routed along the bypass path.

* * * * *